(12) United States Patent
Liebert et al.

(10) Patent No.: US 7,515,514 B2
(45) Date of Patent: *Apr. 7, 2009

(54) APPROXIMATING TOPOLOGY OF OPTICALLY WRITABLE MEDIUM SURFACE

(76) Inventors: Paul Liebert, 7721 NW. Wild Iris, Corvallis, OR (US) 97330; Andrew L. Van Brocklin, 6050 NW. Happy Valley Dr., Corvallis, OR (US) 97330

( * ) Notice: Subject to any disclaimer, the term of this patent is extended or adjusted under 35 U.S.C. 154(b) by 67 days.

This patent is subject to a terminal disclaimer.

(21) Appl. No.: 11/753,507

(22) Filed: May 24, 2007

(65) Prior Publication Data

US 2007/0274184 A1 Nov. 29, 2007

Related U.S. Application Data

(63) Continuation of application No. 10/662,712, filed on Sep. 15, 2003, now Pat. No. 7,239,587.

(51) Int. Cl.
*G11B 7/00* (2006.01)
(52) U.S. Cl. ............... 369/53.14; 369/53.28; 369/53.23
(58) Field of Classification Search ............. 369/53.14, 369/53.23
See application file for complete search history.

(56) References Cited

U.S. PATENT DOCUMENTS

| 4,710,908 A * | 12/1987 | Ohshima et al. ......... 369/44.11 |
| 5,910,936 A * | 6/1999 | Marino ................... 369/53.19 |
| 2002/0191517 A1* | 12/2002 | Honda et al. ............. 369/53.29 |

* cited by examiner

*Primary Examiner*—Jorge L Ortiz Criado

(57) ABSTRACT

A method controls an assembly using an oscillating wave, such that the assembly moves in an oscillated manner in relation to a surface of an optically writable medium in correspondence with oscillation of the oscillating wave. The assembly generates a beam towards the surface of the optically writable medium. A proximity signal is detected in response to the beam being generated towards the surface of the optical medium, and denotes closeness of the assembly to the surface. A number of peaks within the proximity signal are determined. The time at which each peak within the proximity signal occurs is correlated with a value of the oscillating wave at that time, yielding a number of time-value pairs. The topology of the surface of the optical medium is approximated from these time-value pairs.

20 Claims, 7 Drawing Sheets

APPROXIMATING TOPOLOGY OF OPTICALLY WRITABLE MEDIUM SURFACE

RELATED APPLICATIONS

The present patent application is a continuing patent application of and claims priority to the pending U.S. patent application entitled "Approximating topology of optical disc surface," filed on Sep. 15, 2003, and assigned Ser. No. 10/662,712 now U.S. Pat. No. 7,239,587.

BACKGROUND OF THE INVENTION

Computer users employ writable and rewritable optical discs for a variety of different purposes. They may save programs or data to the discs, for archival or distribution purposes. In the case of CD-type discs, users may make music CD's that can be played in audio CD players, or save music data files to the CD's, such as MP3 files, that can be played in special-purpose CD players. In the case of DVD-type discs, users have greater storage capacity available to them than with CD-type discs, and may be able to make video DVD's that can be played in stand-alone DVD players.

Many types of optical discs include a data side and a label side. The data side is where the data is written to, whereas the label side allows the user to label the optical disc. Unfortunately, labeling can be an unprofessional, laborious, and/or expensive process. Markers can be used to write on optical discs, but the results are decidedly unprofessional looking. Special pre-cut labels that can be printed on with inkjet or other types of printers can also be used, but this is a laborious process: the labels must be carefully aligned on the discs, and so on. Special-purpose printers that print directly on the discs may be used, but such printers are fairly expensive. In the patent application entitled "Integrated CD/DVD Recording and Label", filed on Oct. 11, 2001, and assigned Ser. No. 09/976,877, a solution to these difficulties is described, in which a laser is used to label optical discs.

When reading or writing from the label or data side of an optical disc, the surface of the optical disc may be presumed to be perfectly flat. However, in actuality, the optical disc surface is typically slightly warped, having a surface topology that can be generally likened to that of a potato chip, albeit with considerably less warping as compared to a potato chip. Although this slightly warped nature of the optical disc surface may be difficult if not impossible to discern with the naked eye, it can affect reading and writing label markings and data on the surface. Performance in reading and writing may be reduced, and quality may be impaired.

SUMMARY OF THE INVENTION

A method of one embodiment of the invention outputs an oscillating wave towards a surface of an optical disc. A proximity signal is detected in response to the oscillating wave being output towards the surface of the optical disc, and denotes closeness of the oscillating wave to the surface. A number of peaks within the proximity signal are determined. Each peak corresponds to the oscillating wave crossing the surface of the optical disc. The time at which each peak within the proximity signal occurs is correlated with a value of the oscillating wave at that time, yielding a number of time-value pairs. The topology of the surface of the optical disc is approximated from these time-value pairs.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Optical Disc and Optical Disc Surface-Tracking Assembly

Figure 1:
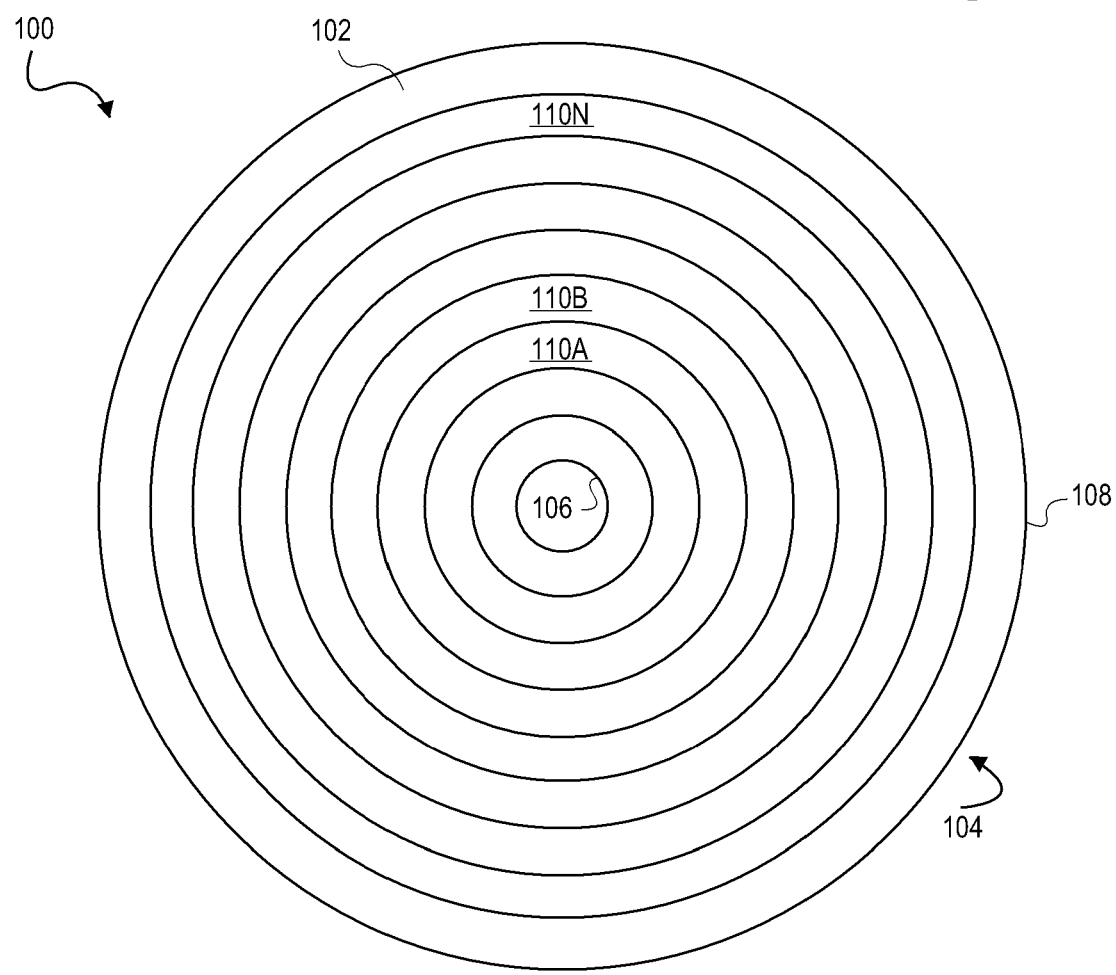
FIG. 1 is a diagram of an optical disc having an optically writable label side with a number of tracks, according to an embodiment of the invention.

FIG. 1 shows an optical disc 100, according to an embodiment of the invention. The optical disc 100 may be a compact disc (CD), a digital versatile disc (DVD), or another type of optical disc. The optical disc 100 has an optically writable label side 102, which is shown in FIG. 1, and an optically writable data side 104 on the opposite side of the optical disc 100. An example of the optically writable label side 102 is particularly disclosed in the patent application entitled "Integrated CD/DVD Recording and Label", filed on Oct. 11, 2001, and assigned Ser. No. 09/976,877. An image may be written to the label side 102, such that the pixels of the image are selectively and correspondingly optically written to the label side 102.

The label side 102 is more generally a label region, and the data side 104 is more generally a data region, in that an optically writable label region may coexist on the same side of the optical disc 100 as an optically writable data region. The optical disc 100 also has an inside edge 106 and an outside edge 108. The optical disc 100 also has a number of concentric circular tracks 110A, 110B, . . . 110N, collectively referred to as the tracks 110. There may be hundreds, thousands, or more of the tracks 110. Alternatively, the tracks 110 may be spiral tracks. An optical marking mechanism, such as a laser, may write marks, or pixels, to marking, or pixel, positions of the tracks 110. The optical marking mechanism accomplishes this by moving over each of the tracks 110, such that the optical disc 100 is rotated so that the optical marking mechanism is able to pass over the entirety of each of the tracks 110.

Figure 2:
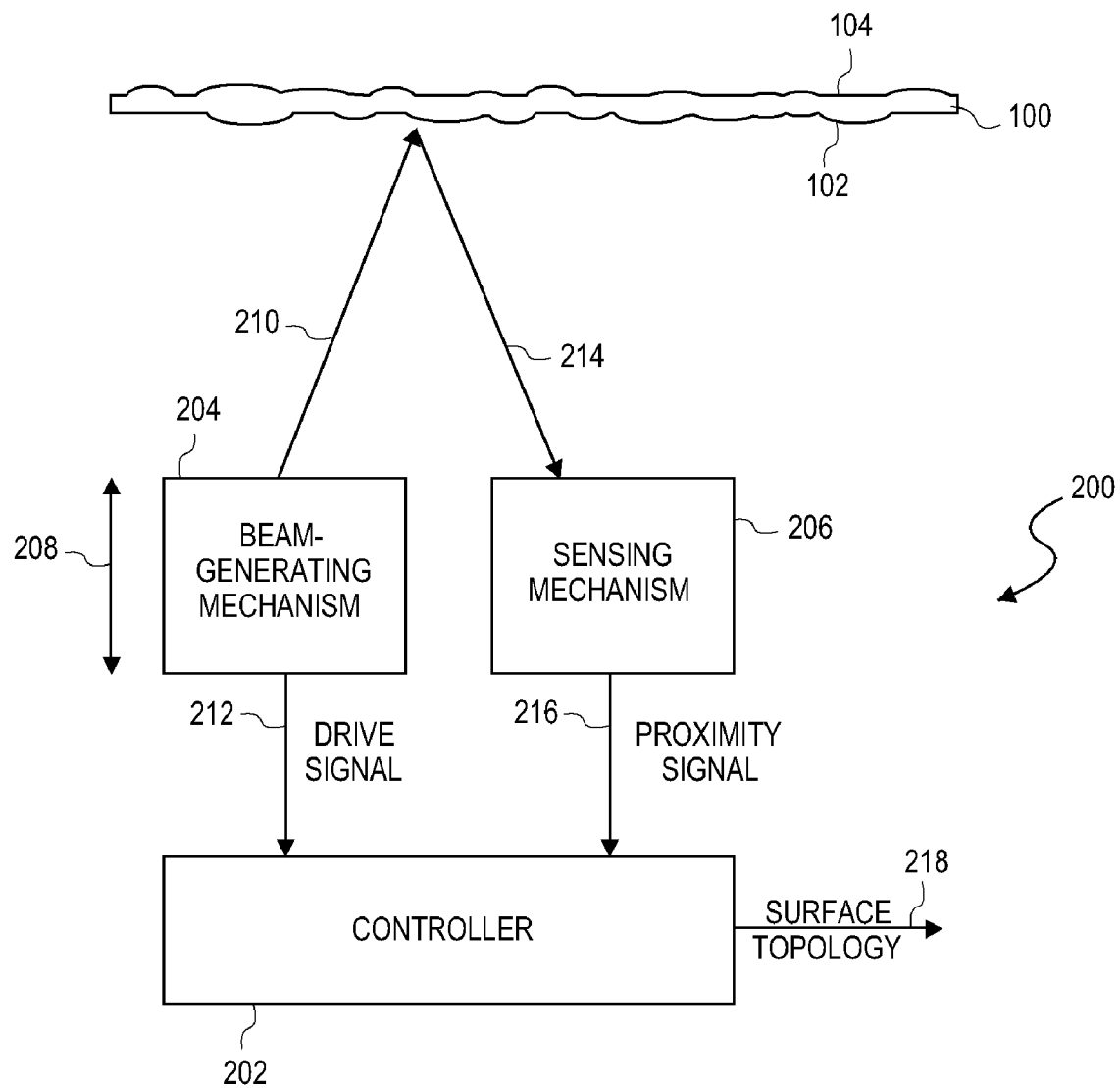
FIG. 2 is a diagram of an optical disc surface-tracking assembly, according to an embodiment of the invention.

FIG. 2 shows an optical disc surface-tracking assembly 200, according to an embodiment of the invention. The assembly 200 may be used to track either the optically writable label surface 102 or the optically writable data surface 104 of the optical disc 100, as well as other types of surfaces of optical discs. Furthermore, the assembly 200 may more generally be a reflective surface-tracking assembly, used for tracking a reflective surface other than an optical disc surface. The assembly 200 is depicted in FIG. 2 as including a controller 202, a beam-generating mechanism 204, and a sensing mechanism 206.

The optical disc surface-tracking assembly 200 is shown in FIG. 2 as being incident to the optically writable label surface 102 of the optical disc 100. Both the label surface 102 and the optically writable data surface 104 of the optical disc 100 are depicted in FIG. 2 as being warped. The degree to which the surfaces 102 and 104 are warped is exaggerated in FIG. 2 for illustrative clarity.

In general, the optical disc surface-tracking assembly 200 operates as follows. The beam-generating mechanism 204 outputs a beam 210, such as an optical beam, which is reflected off the surface 102 of the optical disc 100. The sensing mechanism 206 detects the reflected beam 214 off the surface 102. The beam-generating mechanism 204 provides a drive signal 212 to the controller 202, corresponding to the beam 210, and the sensing mechanism 206 provides a proximity signal 216 to the controller 202, corresponding to the reflected beam 214. In response, the controller 202 determines the surface topology 218 of the surface 102 that is incident to the beam 210.

More specifically, the beam-generating mechanism 204 outputs the beam 210. The beam-generating mechanism 204 is moved closer to and farther away from the label surface 102 of the optical disc 100, as indicated by the bi-directional arrow 208. The movement of the mechanism 204 is in accordance with a desired waveform, such as a sinusoidal wave, a triangle wave, a saw tooth wave, or another type of periodic waveform. The drive signal 212 is thus an oscillating wave. The beam-generating mechanism 204 includes those components that allow for the generation of an optical or other type of beam.

In one embodiment, the beam-generating mechanism 204 is itself moved closer to and farther away from the label surface 102 of the optical disc 100. In this embodiment, the focusing lens of the mechanism 204 through which the optical beam is output is fixed, such that the entire mechanism 204 is moved closer to and farther away from the surface 102 to change the focus in accordance with an oscillating wave, as the drive signal 212. In another embodiment, the focusing lens of the mechanism 204 is the only component of the mechanism 204 that moves closer to and farther away from the surface 102, as indicated by the arrow 208, to change the focus in accordance with the oscillating wave, as the drive signal 212.

The sensing mechanism 206 detects the beam 214, which is the beam 210 that is reflected off the label surface 102 of the optical disc 100. In response, the sensing mechanism 206 generates the proximity signal 216. The proximity signal 216 is the value of the beam as reflected off the surface 102 and detected by the sensing mechanism 206. In particular, the proximity signal 216 is a measure of the absolute closeness of the oscillating wave that is the beam 210 to the surface 102. The beam 210 is oscillated such that it can overshoot the surface 102, as well as may not extend far enough to impinge the surface 102. The proximity signal 216, therefore, indicates how close the beam 210, and thus the corresponding drive signal 212, is to the surface 102 of the optical disc 100. The sensing mechanism 206 includes those components that allow for the sensing of the reflected beam 214, and may be an optical or another type of sensor.

For occurrences of the beam 210 crossing the label surface 102 of the optical disc 100, the proximity signal 216 denotes such crossing with local maximums, or peaks. That is, peaks or local maximums within the proximity signal 216 indicate the times, and thus positions since the beam 210 moves across the surface 102 over time, at which the beam 210 crosses the label surface 102. Because the value of the drive signal 212 is known at these times or positions, the controller 202 is able to approximate the topology of the label surface 102 from the times at which peaks or local maximums within the proximity signal 216 occur, and from the values of the drive signal 212 at these times. This is described in more detail in the next section of the detailed description. By approximating the topology of the surface 102, the controller 202 is thus able to track the surface 102 of the optical disc 100.

Approximating Topology of Optical Disc Surface

Figure 3:
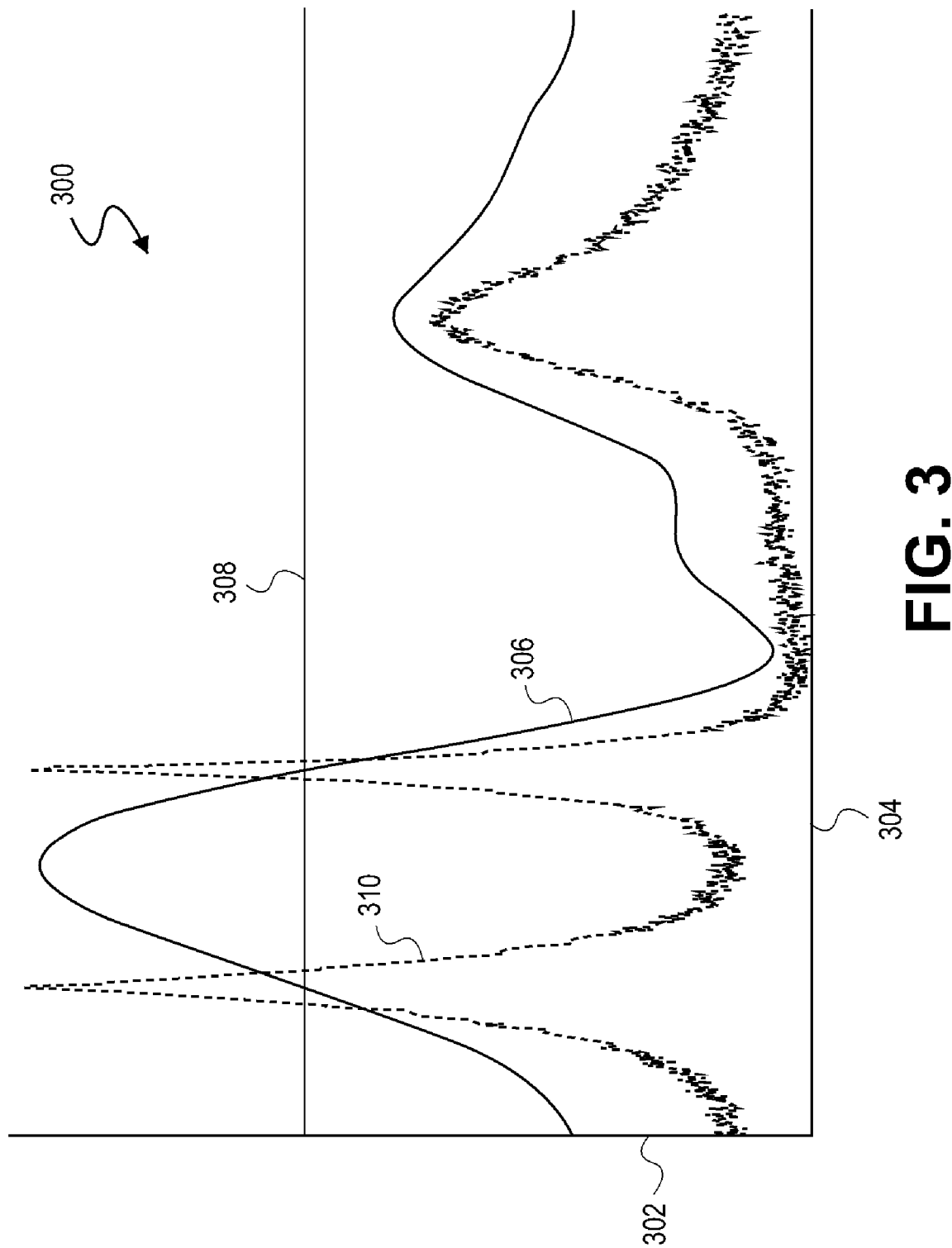
FIG. 3 is a graph depicting how a drive signal intersecting with the surface of an optical disc yields peaks in a proximity signal, according to an embodiment of the invention.

FIG. 3 shows a graph 300 depicting the relationship between a disturbance 306, a drive signal 308, and a sense signal 310, according to an embodiment of the invention. The disturbance 306 can represent the slightly warped or otherwise irregular surface of an optical disc, such as the label surface 102 or the data surface 104 of the optical disc 100. The drive signal 308 is the drive signal 212 in FIG. 2, and is the case where oscillation of the drive signal 308 does not occur, for sake of simplicity. The sense signal 310 is the proximity signal 216 in FIG. 2. The x-axis 304 of the graph 300 denotes time, to which position can correspond.

The y-axis 302 of the graph 300 denotes the values of the disturbance 306, the drive signal 308, and the sense signal 310. For instance, in the case of the disturbance 306, the value denoted on the y-axis 302 can be the height of the surface of an optical disc from a flat reference running through the middle of the optical disc. In the case of the drive signal 308, the value denoted on the y-axis 302 may be the intensity of the drive signal 308.

Furthermore, in the case of the sense signal 310, the value denoted on the y-axis 302 may be a measure of the closeness of the drive signal 308 to the disturbance 306. Higher values within the sense signal 310 indicate that the drive signal 308 is closer to the disturbance 306, and peaks or local maximums within the sense signal 310 indicate that the drive signal 308 has crossed the disturbance 306. Thus, in the graph 300 of FIG. 3, in the two places where the drive signal 308 has crossed the disturbance 306, local maximums or peaks result in the sense signal 310.

Figure 4:
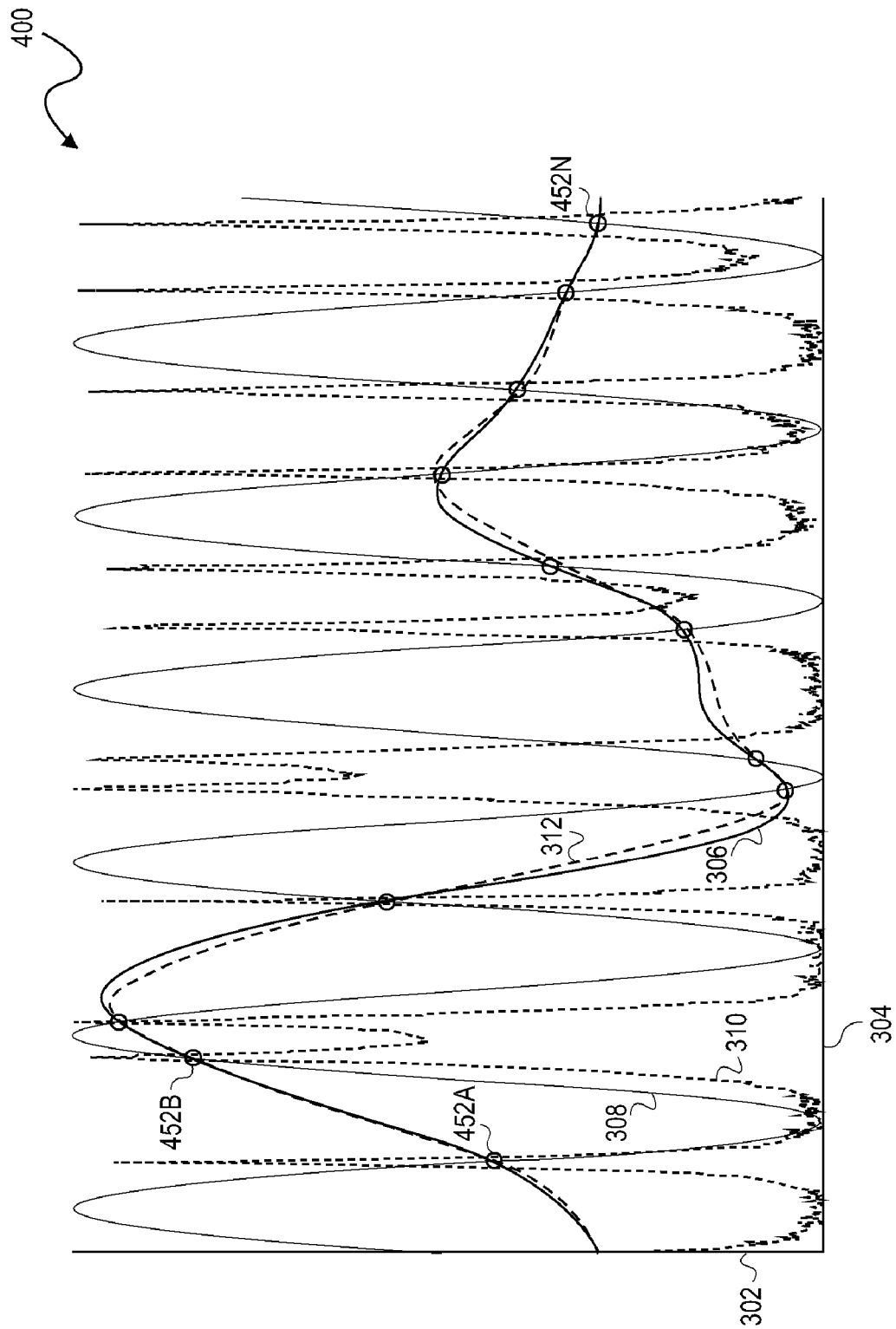
FIG. 4 is a graph depicting how an oscillating wave output towards the surface of an optical disc can approximate the topology of the optical disc surface, according to an embodiment of the invention.

FIG. 4 shows a graph 400 indicating how the drive signal 308 and the sense signal 310 can be used to approximate the disturbance 306 as the approximation 312, according to an embodiment of the invention. As before, the disturbance 306 can represent the slightly warped or otherwise irregular surface of an optical disc, such as the label surface 102 or the data surface 104 of the optical disc 100. The drive signal 308 is the drive signal 212 in FIG. 2, and is the case where oscillation of the drive signal 308 occurs, resulting in an oscillating wave, as has been described. The sense signal 310 is the proximity signal 216 in FIG. 2. The x-axis 304 of the graph 300 denotes time, to which position can correspond, and the y-axis 302 of the graph 300 denotes the values of the disturbance 306, the drive signal 308, the sense signal 310, and the approximation 312.

As before, for each occurrence in which the drive signal 308 crosses the disturbance 306, there is a corresponding peak or local maximum within the sense signal 310. The times, or positions, on the x-axis 304 at which these peaks within the sense signal 310 occur are determined, and are correlated with the corresponding values of the drive signal 308 at these times or positions. This yields a number of time-value, or position-value, pairs, from which the approximation 312 is then determined. These pairs are indicated in FIG. 4 as the points 452A, 452B, . . . , 452N. For example, a curve-fitting approach can be employed to yield the approximation 312 from the time-value pairs. One such curve-fitting approach is a beta-spline. In another curve-fitting approach, the time-value pairs are translated into uniform time samples, such as by linear or another type of interpolation, and then are translated into the frequency domain by a Fourier transform. The low order coefficients in the frequency domain corresponding to the initial harmonics, such as the first three, are then used to generate the approximation 312.

Figure 5:
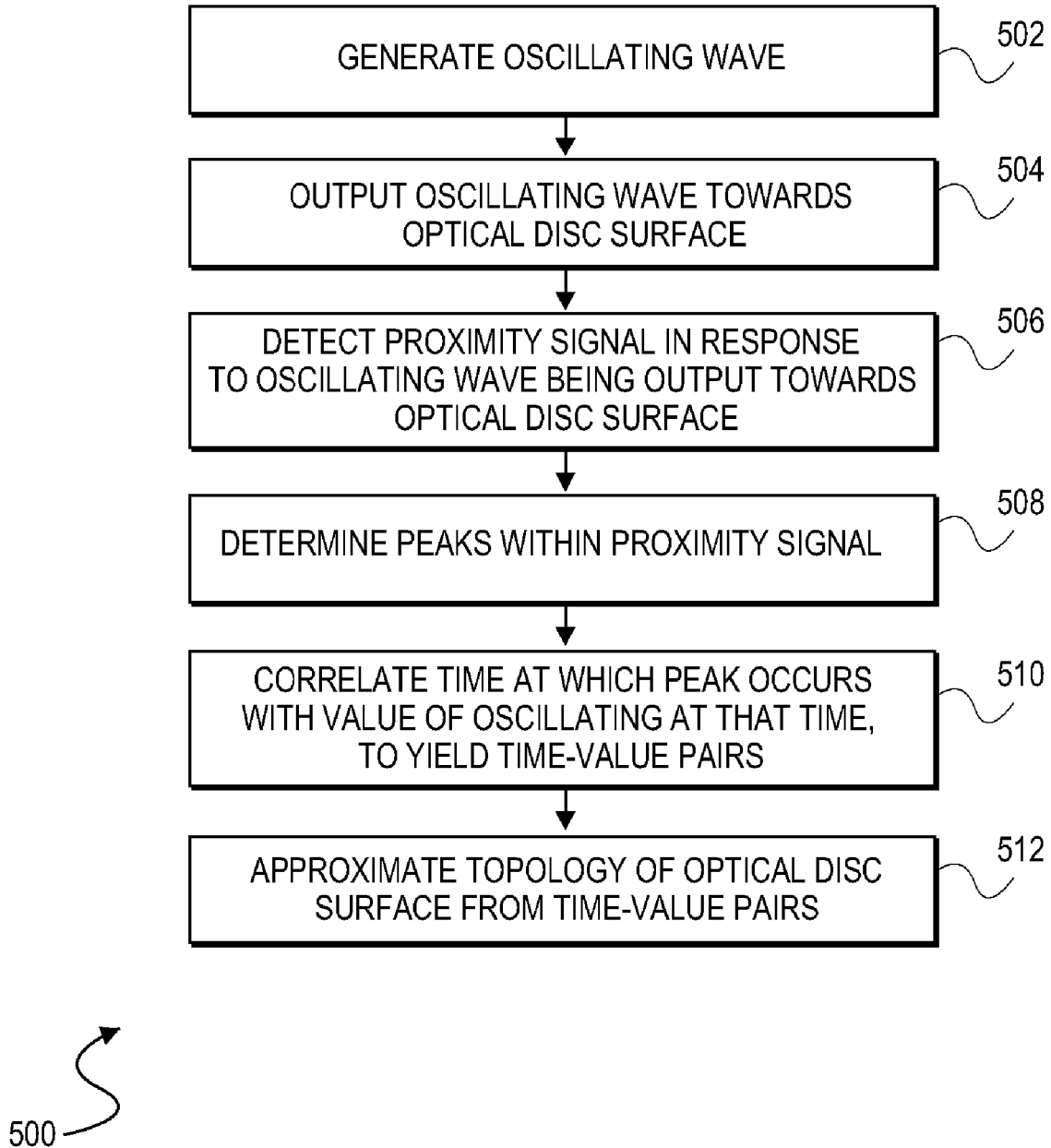
FIG. 5 is a flowchart of a method for using an oscillating wave and the resulting proximity signal to approximate the topology of the surface of an optical disc, according to an embodiment of the invention.

FIG. 5 shows a method 500 for approximating the topology of an optical disc surface, or another type of reflective surface, according to an embodiment of the invention. The method 500 may be implemented as a computer program stored on a computer-readable medium. The medium may be a volatile or a non-volatile medium. The medium may also be a magnetic medium, such as a tape cartridge, a floppy disk, or a hard disk drive, an optical medium, such as an optical disc, and/or a semiconductor medium, such as random-access memory or flash memory. The medium may be part of or accessed by the controller 202 of the assembly 200 of FIG. 2, such that the controller 202 and the assembly 200 can be considered to be performing the method 500.

First, an oscillating wave is generated (502), and output towards a surface of an optical disc (504). The oscillating wave may be the optical beam 210 of FIG. 2 that results from the beam-generating mechanism 204 outputting the optical beam 210 while oscillating to and from the label surface 102 of the optical disc 100, as indicated by the bidirectional arrow 208 in FIG. 2. The surface of the optical disc is slightly warped, or is otherwise an irregular surface, and may be the optically writable label side 102 of the optical disc 100, the optically writable data side 104 of the optical disc 100, or another type of optical disc surface.

A proximity signal is detected in response to the oscillating wave being output towards the optical disc surface (506). For instance, the beam 214 reflected off the optical disc surface 102 of the optical disc 100 in FIG. 2 may be detected, such that the proximity signal is a value of this beam 214. As has been described, the peaks or local maximums within the proximity signal are determined (508), where each peak corresponds to the oscillating wave crossing the optical disc surface. The time at which each peak within the proximity signal occurs is correlated with a value of the oscillating wave at that time (510), to yield a number of time-value pairs. The time-value pairs may also be considered position-value pairs, since the oscillating wave is moving over the surface of the optical disc surface as a function of time.

The topology of the optical disc surface is finally approximated from the time-value pairs (512). In one embodiment, a curve may be curve-fitted onto the time-value pairs to approximate the topology of the optical disc surface. A beta-spline curve-fitting approach can be used, and in one embodiment the Fourier transform can be used, to approximate the topology of the optical disc surface from the time-value pairs. Tracking of the optical disc surface can thus be accomplished utilizing the topology of the surface as has been approximated.

Mass Storage Device

Figure 6:
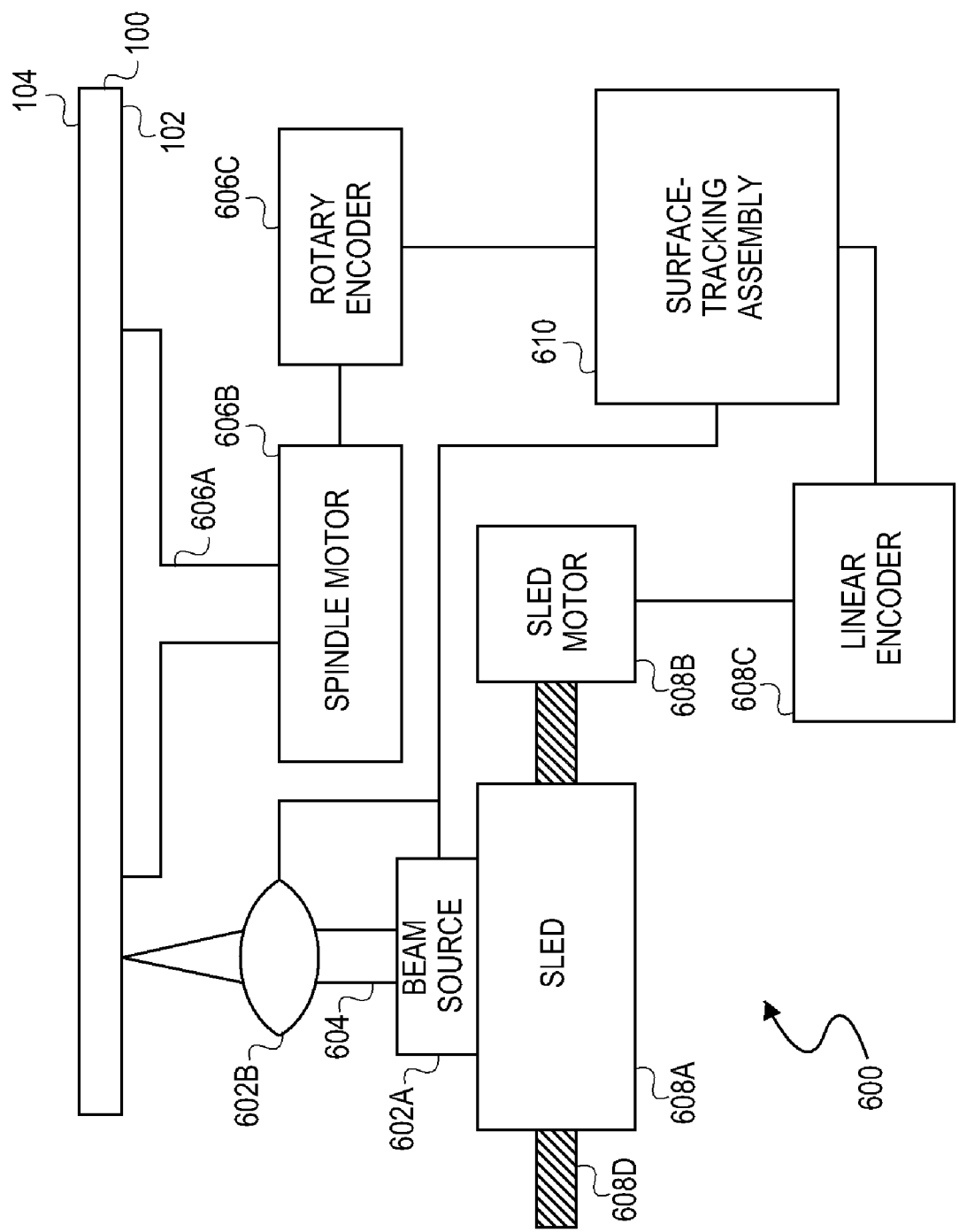
FIG. 6 is a diagram of a mass storage device, according to an embodiment of the invention.

FIG. 6 shows the mass storage device 600, according to an embodiment of the invention. The mass storage device 600 is for reading from and/or writing to the optical disc 100. More specifically, the mass storage device 600 is for reading from and/or writing to an optically writable data region of the optical disc 100, and/or an optically writable label region of the optical disc 100. The mass storage device 600 includes a beam source 602A and an objective lens 602B, which are collectively referred to as the optical marking mechanism 602. The storage device 600 also includes a spindle 606A, a spindle motor 606B, and a rotary encoder 606C, which are collectively referred to as the first motor mechanism 606. The device 600 includes a sled 608A, a sled motor 608B, a linear encoder 608C, which is optional, and a rail 608D, which are collectively referred to as the second motor mechanism 608. The motor mechanisms 606 and 608 can be generally considered a movement mechanism. Finally, the mass storage device 600 includes an optical disc surface-tracking assembly 610, which may be the surface-tracking assembly 200 of FIG. 2 that has been described.

The optical marking mechanism 602 focuses an optical beam 604 on the optical disc 100, for at least marking the label side 102 of the optical disc 100, and which also may be used to read from the label side 102 of the disc 100, as well as read from and/or write to the data side 104 of the disc 100. Specifically, the beam source 602A generates the optical beam 604, which is focused through the objective lens 602B onto the optical disc 100, such as in a manner known to those of ordinary skill within the art.

The first motor mechanism 606 rotates the optical disc 100. Specifically, the optical disc 100 is situated on the spindle 606A, which is rotated, or moved, by the spindle motor 606B to a given position specified by the rotary encoder 606C communicatively coupled to the spindle motor 606B. The rotary encoder 606C may include hardware, software, or a combination of hardware and software.

The second motor mechanism 608 moves the optical marking mechanism 602 radially relative to the optical disc 100. Specifically, the optical marking mechanism 602 is situated on the sled 608A, which is moved on the rail 608D by the sled motor 608B to a given position specified by the linear encoder 608C communicatively coupled to the sled motor 608B. The linear encoder 608C may include hardware, software, or a combination of hardware and software.

The surface-tracking assembly 610 controls the marking mechanism 602 and the motor mechanisms 606 and 608 to cause markings, or pixels, to be written to pixel, or marking, positions on the tracks of optical writable label side 102 of the optical disc 100, such as in accordance with an image to be written to the tracks of the label side 102. The surface-tracking assembly 610 may also control the marking mechanism 602 and the motor mechanisms 606 and 608 to write data to the data side 104 of the optical disc 100. The surface-tracking assembly 610 also causes the motor mechanisms 606 and 608 to move the optical marking mechanism 602 so as to track the optically writable label surface 102 or the optically writable data surface 104 of the optical disc 100, as has been described in the preceding sections of the detailed description.

In one embodiment, the surface-tracking assembly 610 is the surface tracking assembly 200 of FIG. 2 that has been described. In this embodiment, the beam-generating mechanism 204 is replaced by the optical marking mechanism 602, such that the marking mechanism 602 performs the functionality that has been described as being performed by the beam-generating mechanism 204. The surface-tracking assembly 610, however, still includes the sensing mechanism 206 and the controller 202 of FIG. 2, as has been described. The movement mechanism, inclusive of the motor mechanisms 606 and 608, oscillates the optical marking mechanism 602, as denoted by the bidirectional arrow 208 in FIG. 2.

Whereas FIG. 6 shows both a linear encoder 608C and a rotary encoder 606C, other embodiments of the invention may not have either or both of the encoders 608C and 606C. For instance, the sled motor 608B may be a stepper mode in which there is no closed-loop feedback, such that the linear encoder 608C is not present. As another example, rotary encoder 606C may not be present. In such case, either no rotary encoding is accomplished, or the optical disc 100 itself serves as the encoder, via timing marks printing thereon outside of any image areas.

As can be appreciated by those of ordinary skill within the art, the components depicted in the mass storage device 600 are representative of one embodiment of the invention, and do not limit all embodiments of the invention. Other approaches can also be employed. As only one example, the sled 608A may be positioned with the sled motor 608B, with finer adjustment obtained using a voice coil attached to the beam source 602A and/or the objective lens 602B.

Figure 7:
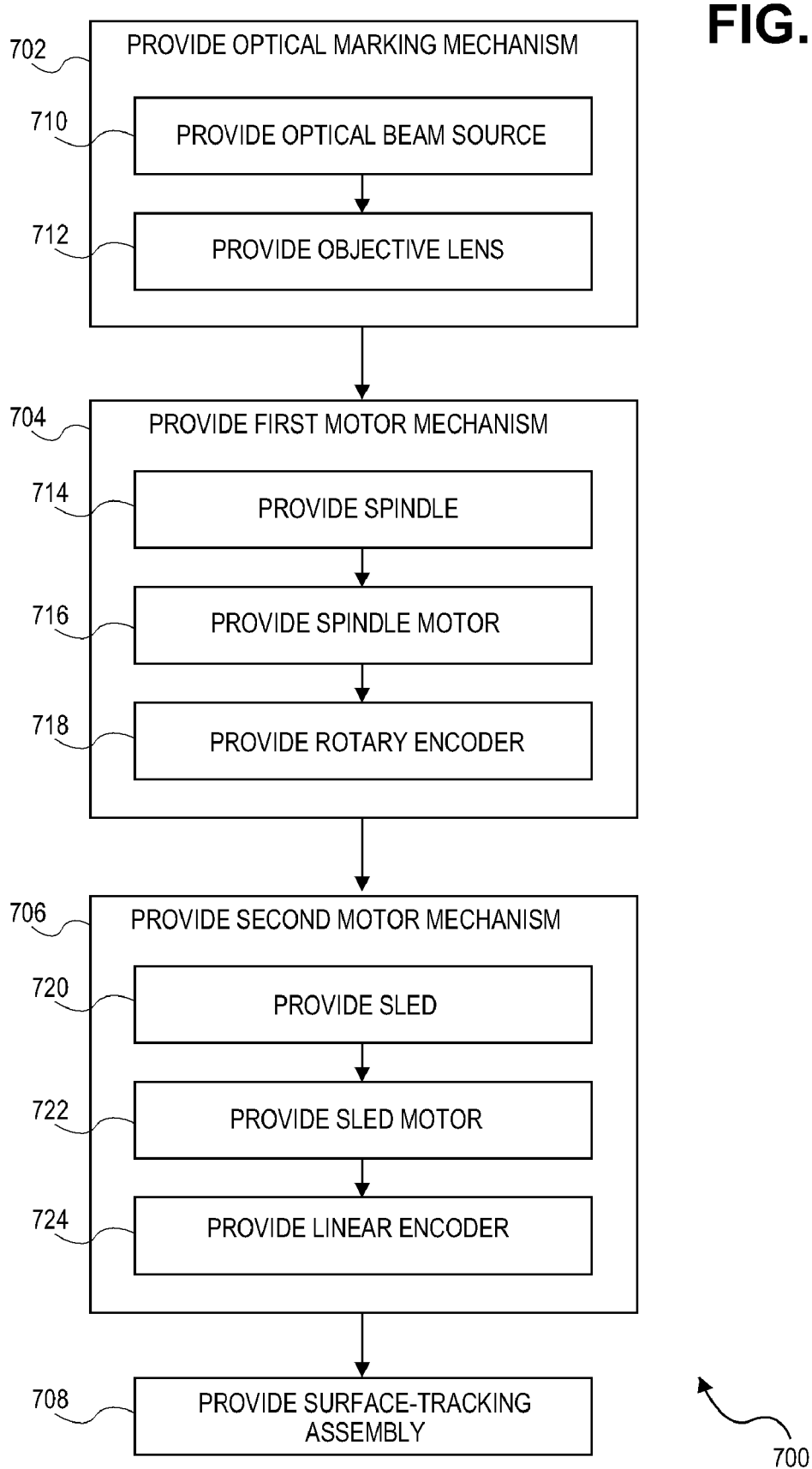
FIG. 7 is a flowchart of a method for manufacturing the mass storage device of FIG. 6, according to an embodiment of the invention.

FIG. 7 shows a method of manufacture 700 for the mass storage device 600 of FIG. 6, according to an embodiment of the invention. The method 700 includes providing the optical marking mechanism 602 (702), providing the first motor mechanism 606 (704), providing the second motor mechanism 608 (706), and providing the surface-tracking assembly 610 (708). In one embodiment, providing the optical marking mechanism 602 includes providing the optical beam source 602A (710) and the objective lens 602B (712), whereas providing the first motor mechanism 606 in one embodiment includes providing the spindle 606A (714), the spindle motor 606B (716), and the rotary encoder 606C (718). Finally, providing the second motor mechanism 608 in one embodiment includes providing the sled 608A (720), the sled motor 608B (722), and the linear encoder 608C (724).

Conclusion

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

We claim:

1. A method comprising:
   controlling an assembly using an oscillating wave, such that the assembly moves in an oscillated manner in relation to a surface of an optically writable medium in correspondence with oscillation of the oscillating wave, the assembly generating a beam towards the surface of the optically writable medium;
   detecting a proximity signal in response to the beam being generated towards the surface of the optically writable medium, the proximity signal denoting closeness of the assembly to the surface of the optically writable medium;
   determining a plurality of peaks within the proximity signal;
   correlating a time at which each peak within the proximity signal occurs with a value of the oscillating wave at the time to yield a plurality of time-value pairs; and,
   approximating a topology of the surface of the optically writable medium from the plurality of time-value pairs.

2. The method of claim 1, further comprising initially generating the oscillating wave.

3. The method of claim 1, wherein detecting the proximity signal comprises detecting the beam reflected by the surface of the optically writable medium with the assembly, the proximity signal determined as a value of the beam reflected by the surface of the optically writable medium over time.

4. The method of claim 1, wherein the surface of the optically writable medium is an irregular surface.

5. The method of claim 1, wherein the surface of the optically writable medium is one of an optically writable label side and an optically writable data side of the optical disc.

6. The method of claim 1, wherein the oscillating wave is one of a triangle wave, a saw tooth wave, and a sinusoidal wave.

7. The method of claim 1, wherein determining the plurality of peaks within the proximity signal comprises determining a plurality of local maximums within the proximity signal.

8. The method of claim 1, wherein approximating the topology of the surface of the optically writable medium from the plurality of time-value pairs comprises curve-fitting a curve onto the plurality of time-value pairs to approximate the topology of the surface of the optically writable medium.

9. The method of claim 8, wherein curve-fitting the curve onto the plurality of time-value pairs to approximate the topology of the surface of the optically writable medium comprises using a beta-spline curve-fitting approach to approximate the topology of the surface of the optically writable medium.

10. The method of claim 8, wherein curve-fitting the curve onto the plurality of time-value pairs to approximate the topology of the surface of the optically writable medium comprises using a number of coefficients of a Fourier series of the plurality of time-value pairs to approximate the topology of the surface of the optically writable medium.

11. A computer-readable medium having a program stored thereon to perform a method comprising:
   controlling an assembly using an oscillating wave, such that the assembly moves in an oscillated manner in relation to a reflective surface in correspondence with oscillation of the oscillating wave, the assembly generating a beam towards the reflective surface;
   receiving a proximity signal detected in response to the assembly generating the beam towards the reflective surface as the assembly moves in the oscillated manner, the proximity signal denoting closeness of the oscillating wave to the reflective surface;
   determining a plurality of local maximums within the proximity signal;
   correlating a time at which each local maximum within the proximity signal occurs with a value of the oscillating wave at the time to yield a plurality of time-value pairs; and,
   approximating a topology of the reflective surface from the plurality of time-value pairs.

12. The medium of claim 11, wherein the oscillating wave is one of a triangle wave, a saw tooth wave, and a sinusoidal wave.

13. The medium of claim 11, wherein approximating the topology of the reflective surface from the plurality of time-value pairs comprises curve fitting a curve onto the plurality of time-value pairs to approximate the topology of the reflective surface.

14. The medium of claim 11, wherein the surface of the optically writable medium is an irregular surface.

15. The medium of claim 11, wherein the surface of the optically writ able medium is one of an optically writable label region and an optically writable data region of an optical disc.

16. A surface-tracking assembly comprising:
- a beam-generating mechanism to generate a beam output towards a surface of an optically writable medium, at least the beam-generating mechanism of the assembly being oscillated to cause the beam to result in an oscillating wave;
- a sensing mechanism to detect the beam reflected by the surface of the optically writable medium to yield a proximity signal as a value of the beam as reflected and detected; and,
- a controller to track the surface of the optically writable medium by approximating a topology of the surface from a plurality of time-value pairs, each time-value pair including a time at which a peak within the proximity signal occurred and a value of the oscillating wave at the time.

17. The assembly of claim 16, wherein the surface of the optically writable medium is one of an optically writable label region and an optically writable data region of an optical disc.

18. The assembly of claim 16, wherein the beam comprises an optical beam.

19. The assembly of claim 16, wherein at least the beam-generating mechanism of the assembly is oscillated in accordance with one of a triangle wave, a square wave, and a sinusoidal wave.

20. The assembly of claim 16, wherein the controller approximates the topology of the surface from the plurality of time-value pairs by curve-fitting a curve onto the plurality of time-value pairs.

* * * * *

UNITED STATES PATENT AND TRADEMARK OFFICE
CERTIFICATE OF CORRECTION

PATENT NO. : 7,515,514 B2 Page 1 of 1
APPLICATION NO. : 11/753507
DATED : April 7, 2009
INVENTOR(S) : Paul Liebert et al.

It is certified that error appears in the above-identified patent and that said Letters Patent is hereby corrected as shown below:

In column 9, line 9, in Claim 15, delete "writ able" and insert -- writable --, therefor.

In column 10, line 15, in Claim 19, delete "of" and insert -- of: --, therefor.

Signed and Sealed this

Fifteenth Day of June, 2010

David J. Kappos
*Director of the United States Patent and Trademark Office*